Feb. 22, 1927.

H. M. WILLIAMS

BEARING

Filed Nov. 7, 1923

1,618,853

Inventor
Harry M. Williams
By Spencer Sewall and Hardman
His Attorneys

Patented Feb. 22, 1927.

1,618,853

UNITED STATES PATENT OFFICE.

HARRY M. WILLIAMS, OF DAYTON, OHIO, ASSIGNOR TO GENERAL MOTORS RESEARCH CORPORATION, OF DAYTON, OHIO, A CORPORATION OF DELAWARE.

BEARING.

Application filed November 7, 1923. Serial No. 673,274.

This invention relates to improvements in bearings and more particularly to bearings provided in the ends of vehicle springs.

It is among the objects of the invention to prevent dust and dirt from the roadway from entering such bearings.

It is also among the objects of the present invention to prevent rattle of spring shackles by providing means which will automatically take up side play caused by wear on the ends of the bearings and on the shackles.

The above mentioned objects are attained by providing a cover on each side of the spring portion that contains the bushing, this spring portion being termed the "spring-eye" hereinafter. This cover is adapted to fit snugly around the shackle bolt of the bearing and has a flanged portion which projects into an annular groove formed in the side of the spring-eye. A suitable resilient element is interposed between the cover and spring shackle or the portion of the frame supporting this end of the spring, whereby the cover is held in close engagement with the side of the spring-eye.

Further objects and advantages of the present invention will be apparent from the following description, reference being had to the accompanying drawing, wherein a preferred embodiment of one form of the present invention is clearly shown.

Figure 1:
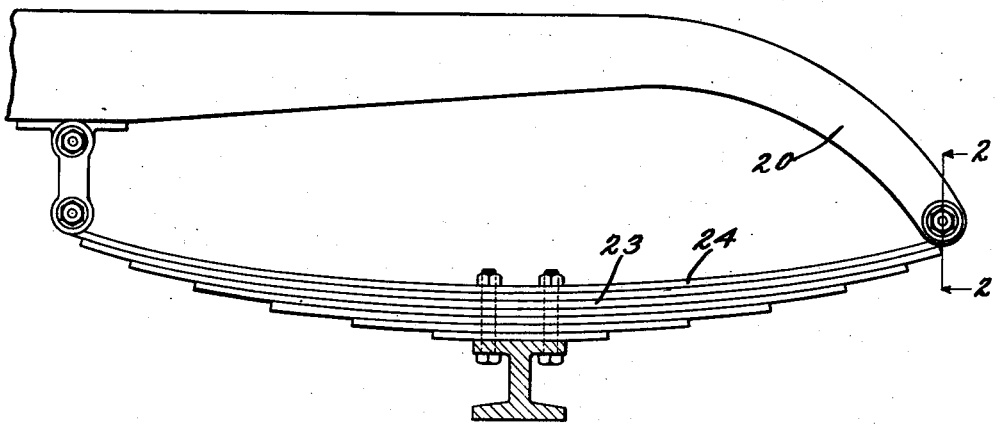
Fig. 1 is a side view of a spring element secured to a vehicle frame, only a portion of the latter being shown.
Figure 2:
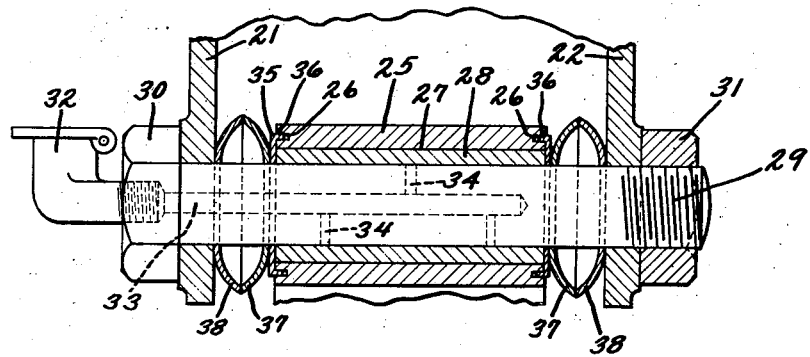
Fig. 2 is a transverse sectional view on line 2—2 of Fig. 1 through one of the bearings and showing a portion of the frame.

Referring to the drawings, the numeral 20 designates the vehicle frame including forked members 21 and 22. 23 designates a spring including a plurality of leaves. The upper spring leaf designated by the numeral 24 is provided with a spring-eye at each of its ends. The spring-eye 25 is shown interposed between the forked members 21 and 22 in Fig. 2. On each side of the spring-eye 25 there is provided an annular groove 26 concentrically arranged with the longitudinal opening 27 formed in the spring-eye and in which the bushing 28 is adapted to be positioned. The ends of the bushing 28 are flush with the sides of the spring-eye 25. A shackle bolt is journalled in the bushing 28, said shackle bolt projecting through openings in each of the forked members 21 and 22. A head portion 30 formed on the shackle bolt abuts against the outer surface of the forked member 21, while a clamping nut 31 screwed onto the opposite end of the shackle bolt 29 is adapted to engage the outer surface of the forked member 22. An oiler 32 is screwed into the head portion 30, said oiler communicating with a longitudinal passage 33 formed in the shackle bolt 29. A plurality of channels 34 communicate with the longitudinal channel 33 and the outside surface of the shackle bolt 29 so that oil introduced into the oiler 32 may pass through the channel 33 into channels 34 and thence to the inner surface of the bushing 28, keeping the same lubricated.

A circular disc 34 having a peripheral flange 36 is positioned on each side of the spring-eye 25, the flange 26 of said discs being adapted to enter into the groove 26 formed in the spring-eye. This disc is provided with a concentric opening of such a size as to fit snugly over the shackle bolts 29. Each of the discs 35 has secured thereto a cup-shaped resilient washer 37, the peripheral edge of said washer projecting toward its respective forked frame member. Another similar cup-shaped washer 38 is associated with this first mentioned washer, its peripheral edge engaging with the peripheral edge of the first mentioned washer. The peripheral edges of both of these cup-shaped washers 37 and 38 are flattened so that when they are assembled the flattened surfaces will lie together, forming a bearing, one for the other, and, at the same time, a dust proof joint between these two elements. Both these washers are provided with concentric openings of such a size as to snugly fit over the shackle bolts 29.

In assembling this device the two washers may be placed under initial compression in order to position them between the ends of the spring-eye and the respective shackle or frame portion, and, to obtain a greater degree of compression of the resilient elements, the clamping nut 31 may be operated to draw together the two forked members 21 and 22 or the spring shackle.

As is shown in the drawing, the washer portion 37 may be welded or otherwise secured integrally with the disc 35, forming a sealed connection between these two elements. However, as these two elements have a substantially large contacting area therebetween and inasmuch as these elements are tightly clamped against each other when in assembled position, a substantially dust proof construction may be provided without welding the two elements together as has been described above.

From the foregoing it may be seen that any road dust or dirt in order to enter into the bearing proper and cause undue wear thereon, must pass either between the surfaces of engagement between the washers 37 and 38 or the point of engagement of the washer 38 with its respective forked member frame. However, the resiliency of these elements will cause these points of engagement to be substantially sealed, so that the possibility of dust entering into the bearing is substantially eliminated.

If, however, for any reason these points of engagement should become worn and permit dust to enter, the dust accumulates in the space within the two-cup-shaped washers 37 and 38 and tends to gather in the bottom thereof, rather than work its way past the snug joint between the shackle bolts and the washer portion 37 and disc 35.

While the form of embodiment of the present invention as herein disclosed, constitutes a preferred form, it is to be understood that other forms might be adopted, all coming within the scope of the claims which follow.

What is claimed is as follows:

1. A dirt guard for vehicle spring bearings, comprising in combination, a spring-eye interposed between forked members of the vehicle frame; a bushing in said spring-eye; a shackle bolt journalled in said bushing and projecting through the forked members of the frame; a flanged disc on each side of spring-eye snugly fitting on the shackle bolt and having its flanged portion projecting into a groove formed in the side of the spring-eye whereby each end of the bushing is entirely enclosed; and a resilient hollow clamping washer interposed between the disc and its respective fork member of the frame to hold the disc in position.

2. A device of the character described, comprising in combination, a bearing housing; a bushing in said housing; an apertured supporting member adjacent each side of the bearing housing; a bolt journaled in said bushing and extending through apertures in the supporting members; a flanged disc on each side of the bearing housing, snugly fitting about the bolt, and having the flange thereof extending into a groove formed in the respective end of the bearing housing; and a resilient clamping member interposed between the respective supporting members and the adjacent flanged disc.

In testimony whereof I hereto affix my signature.

HARRY M. WILLIAMS